United States Patent
Ren et al.

(10) Patent No.: US 11,168,918 B2
(45) Date of Patent: Nov. 9, 2021

(54) CONTROL METHOD AND CONTROL SYSTEM FOR VARIABLE-FREQUENCY COMPRESSOR, AND AIR CONDITIONER

(71) Applicants: HEFEI MIDEA HEATING & VENTILATING EQUIPMENT CO., LTD., Hefei (CN); GD MIDEA HEATING & VENTILATING EQUIPMENT CO., LTD., Foshan (CN)

(72) Inventors: Linxing Ren, Hefei (CN); Yongfeng Xu, Hefei (CN); Xihua Ma, Hefei (CN)

(73) Assignees: HEFEI MIDEA HEATING & VENTILATING EQUIPMENT CO., LTD., Anhui (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 112 days.

(21) Appl. No.: 16/619,705

(22) PCT Filed: Jun. 3, 2019

(86) PCT No.: PCT/CN2019/089871
§ 371 (c)(1),
(2) Date: Dec. 5, 2019

(87) PCT Pub. No.: WO2020/052281
PCT Pub. Date: Mar. 19, 2020

(65) Prior Publication Data
US 2020/0166236 A1    May 28, 2020

(30) Foreign Application Priority Data

Sep. 13, 2018  (CN) .......................... 201811069946.8

(51) Int. Cl.
*F24F 11/86* (2018.01)
*F24F 11/65* (2018.01)
*H02P 27/04* (2016.01)

(52) U.S. Cl.
CPC .............. *F24F 11/86* (2018.01); *F24F 11/65* (2018.01); *H02P 27/04* (2013.01)

(58) Field of Classification Search
CPC ............ F24F 11/86; F24F 11/65; H02P 27/04
(Continued)

(56) References Cited

U.S. PATENT DOCUMENTS

2015/0204594 A1* 7/2015 Luo .......................... F25B 13/00
                                                                      62/115

FOREIGN PATENT DOCUMENTS

CN    101968249 A    2/2011
CN    104236018 A    12/2014
(Continued)

OTHER PUBLICATIONS

Chinese Office Action dated Jan. 7, 2020.
International Search Report and Written Opinion dated Aug. 22, 2019 from State Intellectual Property Office of the P.R. China.

*Primary Examiner* — Jigneshkumar C Patel
(74) *Attorney, Agent, or Firm* — Dilworth & Barrese, LLP.; Michael J. Musella, Esq.

(57) ABSTRACT

The control method and system for the variable-frequency compressor includes: acquiring an operation current and an operation frequency of the variable-frequency compressor; determining that the operation current is greater than or equal to a preset frequency-limited current, and reducing the operation frequency to a preset frequency-limited frequency so as to enable the variable-frequency compressor to enter a frequency-limited mode; detecting an operation current at the moment of the variable-frequency compressor every preset duration; determining that the operation current at the
(Continued)

moment meets a preset up-conversion condition, and increasing an operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

18 Claims, 4 Drawing Sheets

(58) Field of Classification Search
USPC .......................................................... 700/276
See application file for complete search history.

(56) References Cited

FOREIGN PATENT DOCUMENTS

| | | | |
|---|---|---|---|
| CN | 105091251 A | | 11/2015 |
| CN | 105135619 A | | 12/2015 |
| CN | 105910233 A | | 8/2016 |
| CN | 107091516 A | | 8/2017 |
| CN | 108278714 A | * | 7/2018 |
| CN | 108278714 A | | 7/2018 |
| CN | 108361924 A | | 8/2018 |
| CN | 108489037 A | | 9/2018 |
| CN | 109282457 A | | 1/2019 |
| JP | H09318138 A | | 12/1997 |

* cited by examiner

Time

Time

CONTROL METHOD AND CONTROL SYSTEM FOR VARIABLE-FREQUENCY COMPRESSOR, AND AIR CONDITIONER

CROSS-REFERENCE TO RELATED APPLICATION

This application is a U.S. national stage filing of PCT/CN2019/089871 filed Jun. 3, 2019, and claims priority to and benefits of Chinese Patent Application Serial No. 201811069946.8, filed with the National Intellectual Property Administration of P. R. China on Sep. 13, 2018, the entire contents of each of which are incorporated herein by reference.

TECHNICAL FIELD

The present disclosure relates to the technical field of air conditioning, in particular to a control method for a variable-frequency compressor, a control system for the variable-frequency compressor, an air conditioner and a computer readable storage medium.

BACKGROUND

Figure 1:
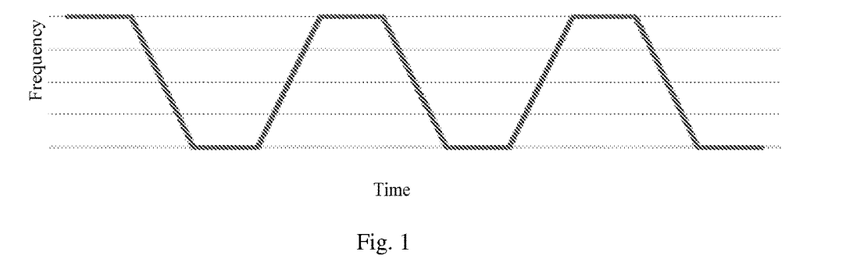
FIG. 1 is a schematic diagram illustrating a frequency curve where the frequency is limited by a current in the related art.

A direct-current variable-frequency compressor is adopted in a full DC variable-frequency multi-split air conditioner. Compressor demagnetization easily occurs when the operation current is too large, and the reliability of an electric control component is influenced by excessive current. As shown in FIG. 1, it is a frequency curve where the frequency is limited by controlling a current in the related art. It is observed that, in the related art, the method for controlling the operation current of an air conditioning system is to limit the frequency output when the current of the compressor exceeds a certain value, and recover the frequency output when the current is lower than a certain value. The control method has the defects that if the range of a value of the current for limiting the frequency and a value of the current for recovering the frequency is too small, the frequency may increase and decreased repeatedly. Periodic fluctuation can still occur even if it is limited to a certain frequency and has a fixed operation for a certain time, and the reliability of the system is influenced. If the range is too broad, the normal capacity output of the air conditioning system is limited, influencing the comfort of a user in using the air conditioner.

SUMMARY

The present disclosure is directed to solve at least one of the technical problems existing in the prior art or the related art.

In this view, a first aspect of the present disclosure provides a control method for a variable-frequency compressor.

A second aspect of the present disclosure provides a control system for a variable-frequency compressor.

A third aspect of the present disclosure provides an air conditioner.

A fourth aspect of the present disclosure provides a computer readable storage medium.

Therefore, according to one aspect of the present disclosure, the present disclosure provides a control method for a variable-frequency compressor, including: acquiring an operation current and an operation frequency of the variable-frequency compressor; determining that the operation current is greater than or equal to a preset frequency-limited current, and reducing the operation frequency to a preset frequency-limited frequency so as to enable the variable-frequency compressor to enter a frequency-limited mode; detecting the operation current at the moment of the variable-frequency compressor every other preset duration; determining that the operation current at the moment meets a preset up-conversion condition, and increasing the operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

According to the control method for the variable-frequency compressor provided by the present disclosure, the control method includes determining that the operation current of the variable-frequency compressor is larger than a preset frequency-limited current corresponding to the operation frequency at the moment, and controlling the variable-frequency compressor to enter a frequency-limited mode where the frequency output of the variable-frequency compressor is limited; and reducing the operation frequency at the moment to a preset operation frequency, wherein the preset operation frequency is a frequency lower than the operation frequency at the moment. Therefore, when the operation current of the variable-frequency compressor is large, the frequency can be immediately reduced, so as to achieve the purpose of rapidly protecting the compressor, and avoid the compressor demagnetization or reliability damage of an electric control component caused by over-large operation current of the variable-frequency compressor. The method also includes, after the variable-frequency compressor enters the frequency-limited mode, judging whether the operation current at the moment meets the preset up-conversion condition every preset duration; when the operation current at the moment meets the preset up-conversion condition, an up-conversion frequency is output in a preset up-conversion frequency step size; if the current variable-frequency compressor meets the preset up-conversion condition all the time, which indicates that the current variable-frequency compressor can normally operate, and thus retreat from the frequency-limited mode; if the up-conversion condition is not met, maintaining the current frequency output; thus, after the output frequency of the variable-frequency compressor is limited to a lower operation frequency, gradually increasing the operation frequency, finely adjusting the operation frequency of the compressor, and finally stably operating the compressor at a proper frequency point rather than always operating at the lowest point of the frequency-limited frequency, so as to avoid the influence on the refrigeration and heating effects of the air conditioning system and also avoid periodic fluctuations due to limitation to a too high frequency.

According to the control method for the variable-frequency compressor, the method can also have the following technical features.

In the above technical solution, preferably, the method further includes the following steps: dividing operation frequencies of the variable-frequency compressor, in an ascending order, into a preset number of frequency tap positions; and setting and storing a frequency-limited current, a frequency-limited frequency, a up-conversion frequency step size and a up-conversion current corresponding to each frequency tap position.

The technical solution includes dividing operation frequencies of the variable-frequency compressor into a preset number of frequency tap positions at a frequency interval, and setting the frequency-limited current, the frequency-limited frequency, the up-conversion frequency step size and the up-conversion current corresponding to each frequency tap position, so that the frequency-limited current, the frequency-limited frequency, the up-conversion frequency step size and the up-conversion current corresponding to the frequency tap position can be quickly searched for different operation frequencies. The control speed of the variable-frequency compressor is improved, and the reliability of the system is further guaranteed. Herein, when the frequency is up-converted if meeting the preset up-conversion condition, the frequency value each time the same frequency tap position is up-converted by can be the same or different at the same frequency tap position.

In any of the above technical solutions, preferably, after acquiring an operation current and an operation frequency of the variable-frequency compressor, the method further includes: inquiring a frequency tap position corresponding to the operation frequency; acquiring a frequency-limited current, a frequency-limited frequency and an up-conversion frequency step size corresponding to the frequency tap position; and setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size.

According to the technical solution, the preset frequency-limited current, the preset frequency-limited frequency and the preset up-conversion frequency step size corresponding to the operation frequency at the moment of the variable-frequency compressor are searched by the preset and stored corresponding relation after the acquiring an operation current and an operation frequency of the variable-frequency compressor, so that the output frequency of the variable-frequency compressor is accurately controlled, and the final operation of the variable-frequency compressor at a proper frequency is guaranteed.

In any of the above technical solutions, preferably, the method further includes: acquiring an up-conversion current corresponding to a frequency tap position; detecting the operation current at the moment of the variable-frequency compressor specifically including: detecting the operation current at the moment, and determining that the operation current at the moment is less than the up-conversion current corresponding to the frequency tap position, so as to meet the preset up-conversion condition.

According to the technical solution, the method includes acquiring an up-conversion current corresponding to a frequency tap position before the detecting the operation current at the moment of the variable-frequency compressor, so that the judgment accuracy is improved when judging whether the variable-frequency compressor meets the preset up-conversion condition. The specific judgment process includes judging whether the operation current at the moment is less than the up-conversion current corresponding to the frequency tap position; if the preset up-conversion current is less than the frequency-limited current, the operation current at the moment meets the up-conversion condition; that is, if the operation current at the moment of the variable-frequency compressor is a small value, the current frequency output can be slightly up-converted by a few hertz, so as to avoid the influence on the refrigeration and heating effects caused by the fact that the variable-frequency compressor is always at a lower operation frequency.

In any of the above technical solutions, preferably, the preset up-conversion frequency step size is less than a difference between the operation frequency and the frequency-limited frequency.

In the technical solution, the preset up-conversion frequency step size is less than a difference between the operation frequency and the frequency-limited frequency, that is, when the operation current of the variable-frequency compressor is large, the output frequency is directly limited to at a lower operation frequency, and when the preset up-conversion condition is met, the output frequency of the variable-frequency compressor is finely adjusted step by step, and only a few Hertz rises each time, so as to, on the one hand, avoid the influence on the refrigeration and heating effects of the air conditioning system caused by the fact that the variable-frequency compressor operates at the lowest point of the frequency-limited frequency uniformly, and on the other hand, also avoid the periodic fluctuation due to limitation to a too high frequency.

According to a second aspect of the present disclosure, there is provided a control system for a variable-frequency compressor, including: a memory configured to store a computer program; a processor configured to execute a computer program to perform: acquiring an operation current and an operation frequency of the variable-frequency compressor; determining that the operation current is greater than or equal to a preset frequency-limited current, and reducing the operation frequency to a preset frequency-limited frequency so as to enable the variable-frequency compressor to enter a frequency-limited mode; detecting the operation current at the moment of the variable-frequency compressor every preset duration; determining that the operation current at the moment meets a preset up-conversion condition, and increasing the operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

In a control system for a variable-frequency compressor provided by the present disclosure, a computer program is stored by a memory; and when a computer program is executed, if the operation current of the variable-frequency compressor is larger than a preset frequency-limited current corresponding to the operation frequency at the moment, the processor controls the variable-frequency compressor to enter a frequency-limited mode where the frequency output of the variable-frequency compressor is limited; and the operation frequency at the moment is reduced to a preset operation frequency, wherein the preset operation frequency is a frequency lower than the operation frequency at the moment. Therefore, when the operation current of the variable-frequency compressor is large, the frequency can be immediately reduced, so as to achieve the purpose of rapidly protecting the compressor, and avoid the compressor demagnetization or reliability damage of an electric control component caused by overlarge operation current of the variable-frequency compressor. The method also includes, after the variable-frequency compressor enters the frequency-limited mode, judging whether the operation current at the moment meets the preset up-conversion condition every preset duration; when the operation current at the moment meets the preset up-conversion condition, an up-conversion frequency is output in a preset up-conversion frequency step size; if the current variable-frequency compressor meets the preset up-conversion condition all the time, which indicates that the current variable-frequency compressor can normally operate, and thus retreat from the frequency-limited mode; if the up-conversion condition is not met, maintaining the current frequency output; thus, after the output frequency of the variable-frequency compressor is limited to a lower operation frequency, gradually increasing the operation frequency, finely adjusting the operation frequency of the compressor, and finally stably operating the compressor at a proper frequency point rather than always operating at the lowest point of the frequency-limited frequency, so as to avoid the influence on the refrigeration and heating effects of the air conditioning system and also avoid periodic fluctuations due to limitation to a too high frequency.

According to the control system for the variable-frequency compressor, the system can also have the following technical features.

In the above technical solution, preferably, the processor is also configured to execute a computer program to perform: dividing operation frequencies of the variable-frequency compressor into, in an ascending order, a preset number of frequency tap positions; and setting and storing a frequency-limited current, a frequency-limited frequency, an up-conversion frequency step size and an up-conversion current corresponding to each frequency tap position.

The technical solution includes dividing operation frequencies of the variable-frequency compressor, in an ascending order, into a preset number of frequency tap positions at a frequency interval, and setting the frequency-limited current, the frequency-limited frequency, the up-conversion frequency step size and the up-conversion current corresponding to each frequency tap position, so that the frequency-limited current, the frequency-limited frequency, the up-conversion frequency step size and the up-conversion current corresponding to the frequency tap position can be quickly searched for different operation frequencies. The control speed of the variable-frequency compressor is improved, and the reliability of the system is further guaranteed. Herein, when the frequency is up-converted if meeting the preset up-conversion condition, the frequency value each time the same frequency tap position is up-converted by can be the same or different at the same frequency tap position.

In any of the above technical solutions, the processor is preferably also configured to execute a computer program to perform: inquiring a frequency tap position corresponding to the operation frequency; acquiring a frequency-limited current, a frequency-limited frequency and an up-conversion frequency step size corresponding to the frequency tap position; and setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size.

According to the technical solution, the preset frequency-limited current, the preset frequency-limited frequency and the preset up-conversion frequency step size corresponding to the operation frequency at the moment of the variable-frequency compressor are searched by the preset and stored corresponding relation after the acquiring an operation current and an operation frequency of the variable-frequency compressor, so that the output frequency of the variable-frequency compressor is accurately controlled, and the final operation of the variable-frequency compressor at a proper frequency is guaranteed.

In any of the above technical solutions, the processor is preferably also configured to execute a computer program to perform: acquiring an up-conversion current corresponding to a frequency tap position; and the processor is particularly configured to execute a computer program to perform: detecting the operation current at the moment, and determining that the operation current at the moment is less than the up-conversion current corresponding to the frequency tap position, so as to meet the preset up-conversion condition.

The technical solution includes acquiring an up-conversion current corresponding to a frequency tap position before judging whether the operation current at the moment of the variable-frequency compressor meets an up-conversion condition, so that the judgment accuracy is improved when judging whether the variable-frequency compressor meets the preset up-conversion condition. The specific judgment process includes judging whether the operation current at the moment is less than the up-conversion current corresponding to the frequency tap position; if the preset up-conversion current is less than the frequency-limited current, the operation current at the moment meets the up-conversion condition; that is, if the operation current at the moment of the variable-frequency compressor is a less value, the current frequency output can be slightly up-converted by a few hertz, so as to avoid the influence on the refrigeration and heating effects caused by the fact that the variable-frequency compressor is always at a lower operation frequency.

In any of the above technical solutions, preferably, the preset up-conversion frequency step size is less than a difference between the operation frequency and the frequency-limited frequency.

In the technical solution, the preset up-conversion frequency step size is less than a difference between the operation frequency and the frequency-limited frequency, that is, when the operation current of the variable-frequency compressor is large, the output frequency is directly limited to at a lower operation frequency, and when the preset up-conversion condition is met, the output frequency of the variable-frequency compressor is finely adjusted step by step, and only a few Hertz rises each time, so as to, on the one hand, avoid the influence on the refrigeration and heating effects of the air conditioning system caused by the fact that the variable-frequency compressor operates at the lowest point of the frequency-limited frequency uniformly, and on the other hand, also avoid the periodic fluctuation due to limitation to a too high frequency.

According to a third aspect of the present disclosure, there is provided an air conditioner including a variable-frequency compressor; and a control system for the variable-frequency compressor in any technical solution, wherein the control system for the variable-frequency compressor is configured to control the variable-frequency compressor.

The present disclosure provides a variable-frequency air conditioner which includes a control system for a variable-frequency compressor in any technical solution, wherein the control system for the variable-frequency compressor is configured to control the variable-frequency compressor, and thus it has all the technical effects of the control system for the variable-frequency compressor, which will not be described in detail herein.

According to a fourth aspect of the present disclosure, there is provided a computer readable storage medium having stored therein a computer program that, when executed by a processor, causes the processor to perform a control method for a variable-frequency compressor as described in any of the above technical solutions.

The present disclosure provides a computer readable storage medium having stored therein a computer program that, when executed by a processor, causes the processor to perform a control method for a variable-frequency compressor as described in any of the above technical solutions, and thus it has all the technical effects of the control method for the variable-frequency compressor, which will not be described in detail herein.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

In order that the above aspects, features and advantages of the present disclosure may be more clearly understood, the present disclosure is described in further detail below with reference to the accompanying drawings and detailed description. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein. Therefore, the scope of protection of the present disclosure is not limited to the specific embodiments disclosed below.

Figure 2:
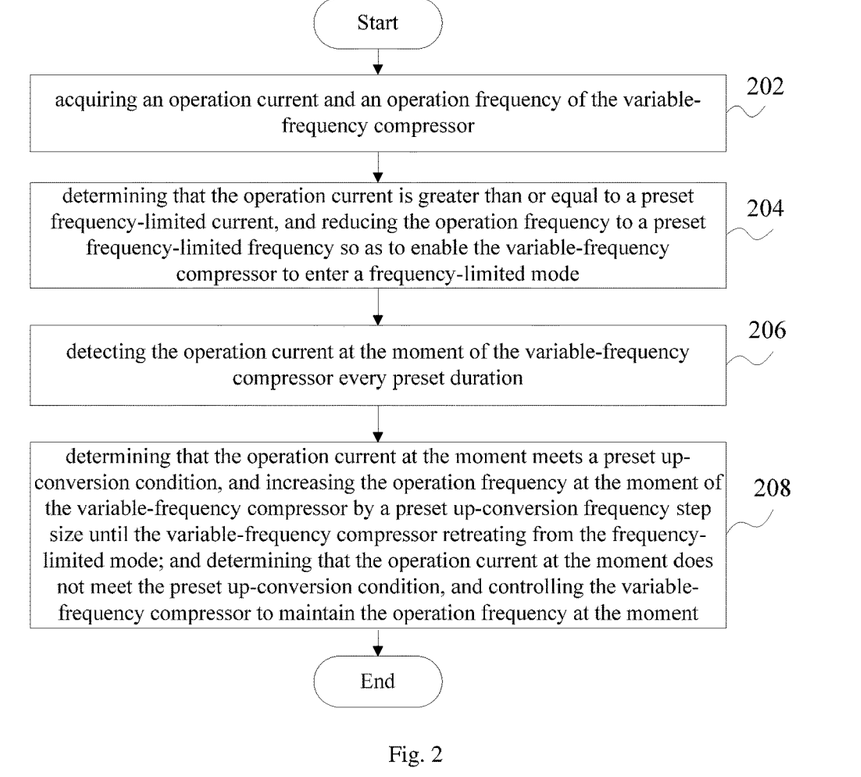
FIG. 2 is a flow diagram illustrating a control method for a variable-frequency compressor according to an embodiment of the present disclosure.

An embodiment of a first aspect of the present disclosure provides a control method for a variable-frequency compressor, and FIG. 2 is a flow diagram illustrating a control method for a variable-frequency compressor according to an embodiment of the present disclosure. As shown in FIG. 2, the control method for the variable-frequency compressor includes:

Step 202, acquiring an operation current and an operation frequency of the variable-frequency compressor;

Step 204, determining that the operation current is greater than or equal to a preset frequency-limited current, and reducing the operation frequency to a preset frequency-limited frequency so as to enable the variable-frequency compressor to enter a frequency-limited mode;

Step 206, detecting the operation current at the moment of the variable-frequency compressor every preset duration; and Step 208, determining that the operation current at the moment meets a preset up-conversion condition, and increasing the operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

Figure 3:
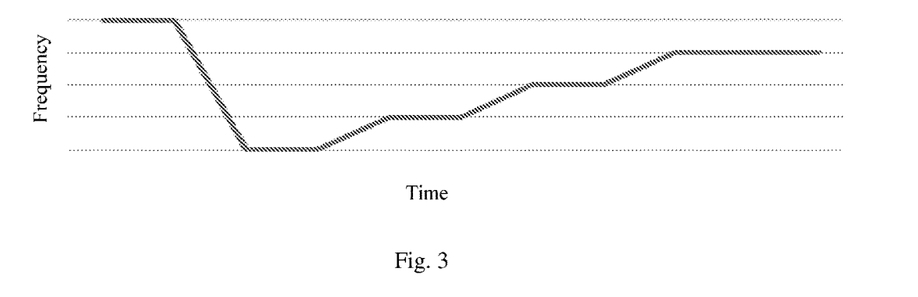
FIG. 3 is a schematic diagram illustrating a frequency curve where the frequency is limited by a current according to an embodiment of the present disclosure.

According to the control method for the variable-frequency compressor provided by the present disclosure, the control method includes determining that the operation current of the variable-frequency compressor is larger than a preset frequency-limited current corresponding to the operation frequency at the moment, and controlling the variable-frequency compressor to enter a frequency-limited mode where the frequency output of the variable-frequency compressor is limited; and reducing the operation frequency at the moment to a preset operation frequency, wherein the preset operation frequency is a frequency lower than the operation frequency at the moment. Therefore, when the operation current of the variable-frequency compressor is large, the frequency can be immediately reduced, so as to achieve the purpose of rapidly protecting the compressor, and avoid the compressor demagnetization or reliability damage of an electric control component caused by over-large operation current of the variable-frequency compressor. The method also includes, after the variable-frequency compressor enters the frequency-limited mode, judging whether the operation current at the moment meets the preset up-conversion condition every preset duration; when the operation current at the moment meets the preset up-conversion condition, an up-conversion frequency is output in a preset up-conversion frequency step size; if the current variable-frequency compressor meets the preset up-conversion condition all the time, which indicates that the current variable-frequency compressor can normally operate, and thus retreat from the frequency-limited mode; if the up-conversion condition is not met, maintaining the current frequency output; thus, as can be seen from the schematic diagram of the frequency curve where the frequency is limited by a current of one embodiment of the present disclosure shown in FIG. 3, after the output frequency of the variable-frequency compressor is limited to a lower operation frequency, gradually increasing the operation frequency, finely adjusting the operation frequency of the compressor, and finally stably operating the compressor at a proper frequency point rather than always operating at the lowest point of the frequency-limited frequency, so as to avoid the influence on the refrigeration and heating effects of the air conditioning system and also avoid periodic fluctuations due to limitation to a too high frequency.

Figure 4:
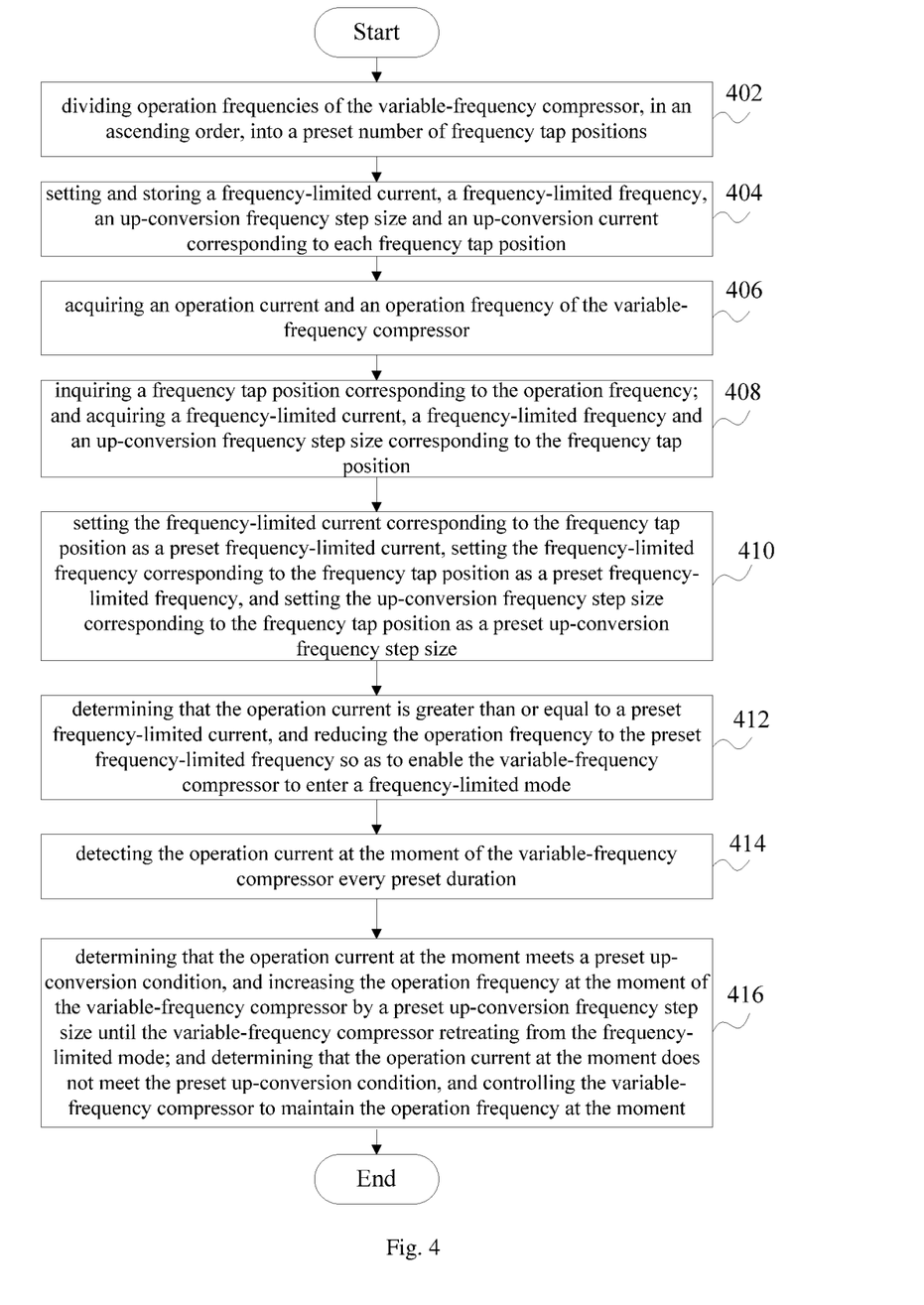
FIG. 4 is a flow diagram illustrating a control method for a variable-frequency compressor according to another embodiment of the present disclosure.

FIG. 4 is a flow diagram illustrating a control method for an outdoor fan of an air conditioner according to another embodiment of the present disclosure. Herein, the method includes:

Step 402, dividing operation frequencies of the variable-frequency compressor, in an ascending order, into a preset number of frequency tap positions;

Step 404, setting and storing a frequency-limited current, a frequency-limited frequency, an up-conversion frequency step size and an up-conversion current corresponding to each frequency tap position;

Step 406, acquiring an operation current and an operation frequency of the variable-frequency compressor;

Step 408, inquiring a frequency tap position corresponding to the operation frequency; and acquiring a frequency-limited current, a frequency-limited frequency and an up-conversion frequency step size corresponding to the frequency tap position;

Step 410, setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size;

Step 412, determining that the operation current is greater than or equal to a preset frequency-limited current, and reducing the operation frequency to the preset frequency-limited frequency so as to enable the variable-frequency compressor to enter a frequency-limited mode;

Step 414, detecting the operation current at the moment of the variable-frequency compressor every preset duration; and Step 416, determining that the operation current at the moment meets a preset up-conversion condition, and increasing the operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

The embodiment includes dividing operation frequencies of the variable-frequency compressor, in an ascending order, into a preset number of frequency tap positions at a frequency interval, and setting the frequency-limited current, the frequency-limited frequency, the up-conversion frequency step size and the up-conversion current corresponding to each frequency tap position, so that the frequency-limited current, the frequency-limited frequency, the up-conversion frequency step size and the up-conversion current corresponding to the frequency tap position can be quickly searched for different operation frequencies. The control speed of the variable-frequency compressor is improved, and the reliability of the system is further guaranteed. Herein, when the frequency is up-converted if meeting the preset up-conversion condition, the frequency value each time the same frequency tap position is up-converted by can be the same or different at the same frequency tap position.

In the embodiment, the preset frequency-limited current, the preset frequency-limited frequency and the preset up-conversion frequency step size corresponding to the operation frequency at the moment of the variable-frequency compressor are searched by the preset and stored corresponding relation after the acquiring an operation current and an operation frequency of the variable-frequency compressor, so that the output frequency of the variable-frequency compressor is accurately controlled, and the final operation of the variable-frequency compressor at a proper frequency is guaranteed.

Figure 5:
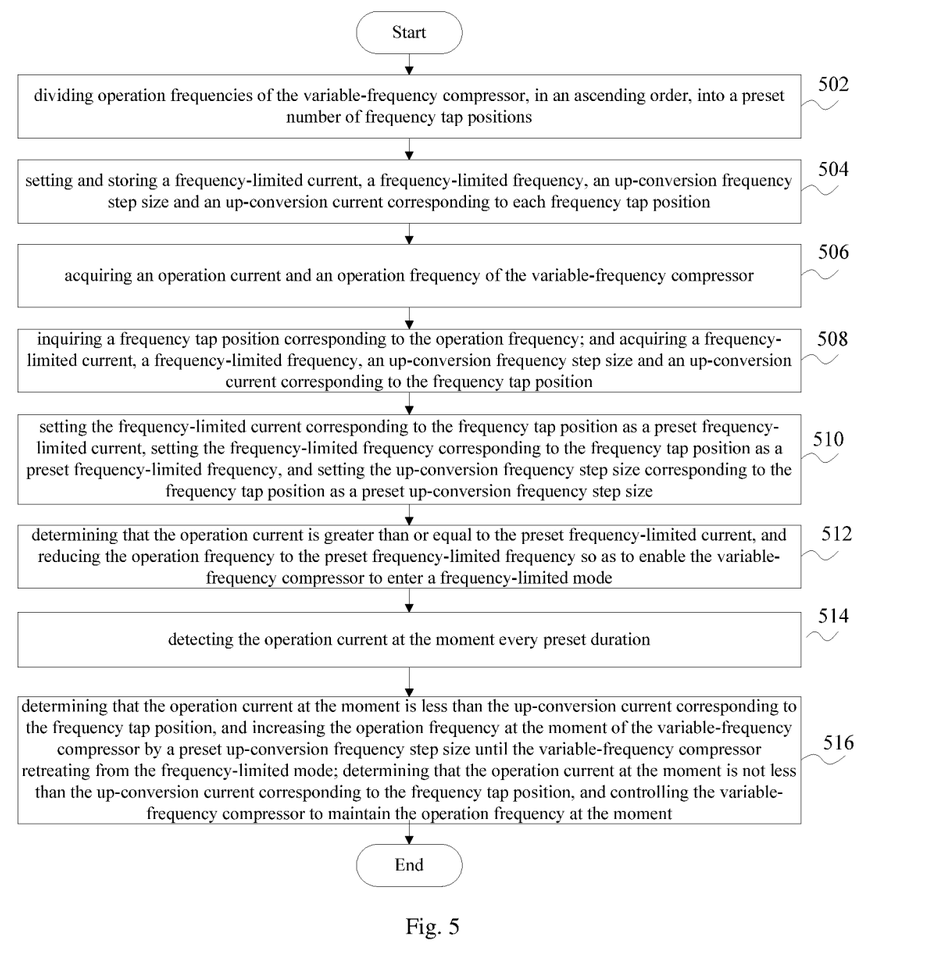
FIG. 5 is a flow diagram illustrating a control method for a variable-frequency compressor according to yet another embodiment of the present disclosure.

FIG. 5 is a flow diagram illustrating a control method for an outdoor fan of an air conditioner according to another embodiment of the present disclosure. Herein, the method includes:

Step 502, dividing operation frequencies of the variable-frequency compressor, in an ascending order, into a preset number of frequency tap positions;

Step 504, setting and storing a frequency-limited current, a frequency-limited frequency, an up-conversion frequency step size and an up-conversion current corresponding to each frequency tap position;

Step 506, acquiring an operation current and an operation frequency of the variable-frequency compressor;

Step 508, inquiring a frequency tap position corresponding to the operation frequency; and acquiring a frequency-limited current, a frequency-limited frequency, an up-conversion frequency step size and an up-conversion current corresponding to the frequency tap position;

Step 510, setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size;

Step 512, determining that the operation current is greater than or equal to the preset frequency-limited current, and reducing the operation frequency to the preset frequency-limited frequency so as to enable the variable-frequency compressor to enter a frequency-limited mode;

Step 514, detecting the operation current at the moment every preset duration; and Step 516, determining that the operation current at the moment is less than the up-conversion current corresponding to the frequency tap position, and increasing the operation frequency at the moment of the variable-frequency compressor by a preset up-conversion frequency step size until the variable-frequency compressor retreating from the frequency-limited mode; determining that the operation current at the moment is not less than the up-conversion current corresponding to the frequency tap position, and controlling the variable-frequency compressor to maintain the operation frequency at the moment.

The embodiment includes acquiring an up-conversion current corresponding to a frequency tap position before the detecting the operation current at the moment of the variable-frequency compressor, so that the judgment accuracy is improved when judging whether the variable-frequency compressor meets the preset up-conversion condition. The specific judgment process includes judging whether the operation current at the moment is less than the up-conversion current corresponding to the frequency tap position; if the preset up-conversion current is less than the frequency-limited current, the operation current at the moment meets the up-conversion condition; that is, if the operation current at the moment of the variable-frequency compressor is a small value, the current frequency output can be slightly up-converted by a few hertz, so as to avoid the influence on the refrigeration and heating effects caused by the fact that the variable-frequency compressor is always at a lower operation frequency.

In any of the above embodiments, preferably, the preset up-conversion frequency step size is less than a difference between the operation frequency and the frequency-limited frequency.

In the embodiment, the preset up-conversion frequency step size is less than a difference between the operation frequency and the frequency-limited frequency, that is, when the operation current of the variable-frequency compressor is large, the output frequency is directly limited to at a lower operation frequency, and when the preset up-conversion condition is met, the output frequency of the variable-frequency compressor is finely adjusted step by step, and only a few Hertz rises each time, so as to, on the one hand, avoid the influence on the refrigeration and heating effects of the air conditioning system caused by the fact that the variable-frequency compressor operates at the lowest point of the frequency-limited frequency uniformly, and on the other hand, also avoid the periodic fluctuation due to limitation to a too high frequency.

In a specific embodiment of the present disclosure, different operation frequencies $P_1, P_2, P_3 \ldots P_i \ldots P_m$ (m frequency tap positions) of the compressor correspond to different current-limiting frequency tap positions $X_1, X_2, X_3 \ldots X_1 \ldots X_n$, where n>1 (n is an integer); when the current of the compressor is too large, the frequency is immediately limited to a tap position (has a relative large interval), $X_1, X_2, X_3 \ldots X_1 \ldots X_n$ sub frequency tap positions is included in each large frequency tap position X); and the compressor frequency is finely adjusted by dividing Xi tap position into different sub tap positions $x_{i1}, x_{i2}, x_{i3}, \ldots x_{ii} \ldots x_{in}$ ($x_1$ is a frequency-limited frequency, and $x_{i2}-x_{i1}, x_{i3}-x_{i2}, \ldots x_{ii}-x_{i(i-1)} \ldots$ is a preset up-conversion frequency step size). The specific corresponding relations are detailed in Tables 1 and 2:

TABLE 1

| Frequency tap position | Preset value of sub frequency tap position | | | | |
|---|---|---|---|---|---|
| $P_1$ | $x_{11}$ | $x_{12}$ | ... | $x_{1i}$ | ... $x_{1n}$ |
| $P_2$ | $x_{21}$ | $x_{22}$ | ... | $x_{2i}$ | ... $x_{2n}$ |
| $P_3$ | $x_{31}$ | $x_{32}$ | ... | $x_{3i}$ | ... $x_{3n}$ |
| ... | ... | ... | ... | ... | ... |
| $P_i$ | $x_{i1}$ | $x_{i2}$ | ... | $x_{ii}$ | ... $x_{in}$ |
| ... | ... | ... | ... | ... | ... |
| $P_m$ | $x_{m1}$ | $x_{m2}$ | ... | $x_{mi}$ | ... $x_{mn}$ |

TABLE 2

| Frequency tap position | Current tap position | Preset current value (frequency-limited current) | Current tap position | Preset current value (up-conversion current) |
|---|---|---|---|---|
| $P_1$ | $X_1A$ | $A_1$ | $X_1B$ | $B_1$ |
| $P_2$ | $X_2A$ | $A_2$ | $X_2B$ | $B_2$ |
| $P_3$ | $X_3A$ | $A_3$ | $X_3B$ | $B_3$ |
| ... | ... | ... | ... | ... |
| $P_i$ | $X_iA$ | $A_i$ | $X_iB$ | $B_i$ |
| ... | ... | ... | ... | ... |
| $P_m$ | $X_mA$ | $A_m$ | $X_mB$ | $B_m$ |

In the tables, $x_{11}>x_{21}>x_{31}>x_{i1}>x_{m1}$; $x_{1n}>x_{1i}>x_{13}>x_{12}>x_{11}$; frequency $P_1>P_2>P_3>P_i>P_m$; $A_1>B_1>A_2>B_2>A_3>B_i>A_i>B_m>A_m$.

The specific control process is as follows:

first step: when the compressor frequency $P \geq P_i$ (for example, P can be divided into six tap positions at a frequency interval), the compressor current $I \geq X_i A$, (X is a preset current value), and the frequency is limited to tap position $x_{i1}$ corresponding to $X_i$, and it is maintained for the time t at the tap position $x_{i1}$;

second step: judging whether the compressor current $I<X_iB$ after t time; if so, up-converting to tap position $X_{i2}$, continuing to judge whether $I<X_i B$ after t time; if so, up-converting to tap position $x_{i3}$; if $I<X_i B$ after t time, increasing the frequency to tap position $X_{i+1}$; and if $I \geq X_iB$, the tap position is maintained and not to be adjusted.

Each of $x_{i1}, x_{i2}, x_{i3}, \ldots x_{in}$ is a sub tap position of tap position $X_i$, and tap positions $X_{i+m}$ and $X_{i-m}$ have different sub tap positions of $x_{(i+m)1}, x_{(i+m)2}, x_{(i+m)3} \ldots x_{(i+m)i} \ldots x_{(i+m)n}$ and $x_{(i-m)i}, x_{(i-m)2}, x_{(i-m)3}, \ldots x_{(i-m)i} \ldots x_{(i-m)n}$, respectively. When the current of the compressor is too large, the frequency is immediately limited to a tap position which has a relative large interval (such as tap position $X_i$), and the purpose of rapidly protecting the compressor is achieved (avoiding the situation that direct fine adjustment is likely to cause a too small amplitude of frequency variation, the current cannot be immediately lowered, the compressor or an electronic control component is damaged). Then, fine adjustment is carried out to tap position $X_i$, the current value is judged once at regular intervals (time t), and if the current meets the up-conversion condition, the current is adjusted finely by several HZ each time until reaching $X_{i+1}$.

If the current frequency is $P_2$, the corresponding preset current value is an $A_2$ value of tap position $X_2A$; if the current is larger than $A_2$, the frequency is limited to the $x_{21}$ value; after t time, it is judged whether the current value is less than the preset value $B_2$ of tap position $X_2B$; if so, the frequency rises to the $x_{22}$ value; after t time, it is continuously judged whether the current value is less than $B_2$; if so, the frequency rises to $x_{23}$, and so on; and if the current is still less than $B_2$ when the current rises to $x_{2n}$, the frequency rises to a primary tap position $x_{11}$, and meanwhile it is continuously judged according to the above steps. In this case, the frequency is adjusted at tap position $P_1$, and the preset current value is determined as $B_1$.

The specific embodiment can solve the problems that when the current of the compressor is too large, the frequency output is limited, so that the operation frequency is achieved with a proper current value, the refrigeration and heating effect is prevented from being influenced due to too low frequency limitation, or periodic fluctuation occurs due to too high frequency limitation, which improves the reliability of the system.

Figure 6:
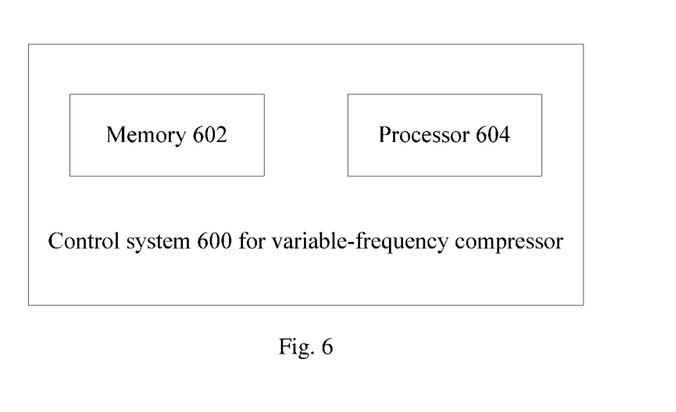
FIG. 6 is a schematic block diagram illustrating a control system for a variable-frequency compressor according to an embodiment of the present disclosure.

An embodiment of the second aspect of the present disclosure provides a control system 600 for a variable-frequency compressor, and FIG. 6 is a flow block diagram illustrating the control system 600 for the variable-frequency compressor according to an embodiment of the present disclosure. The control system 600 for the variable-frequency compressor includes a memory 602 configured to store a computer program; a processor 604 configured to execute a computer program to perform: acquiring an operation current and an operation frequency of the variable-frequency compressor; determining that the operation current is greater than or equal to a preset frequency-limited current, and reducing the operation frequency to a preset frequency-limited frequency so as to enable the variable-frequency compressor to enter a frequency-limited mode; detecting the operation current at the moment of the variable-frequency compressor every preset duration; determining that the operation current at the moment meets a preset up-conversion condition, and increasing the operation frequency at the moment of the variable-frequency compressor by a preset up-conversion frequency step size until the variable-frequency compressor retreating from the frequency-limited mode; and determining that the operation current at the moment does not meet the preset up-conversion condition, and controlling the variable-frequency compressor to maintain the operation frequency at the moment.

In a control system 600 for a variable-frequency compressor provided by the present disclosure, a computer program is stored by a memory 602; and when a computer program is executed, if the operation current of the variable-frequency compressor is larger than a preset frequency-limited current corresponding to the operation frequency at the moment, the processor 604 controls the variable-frequency compressor to enter a frequency-limited mode where the frequency output of the variable-frequency compressor is limited; and the operation frequency at the moment is reduced to a preset operation frequency, wherein the preset operation frequency is a frequency lower than the operation frequency at the moment. Therefore, when the operation current of the variable-frequency compressor is large, the frequency can be immediately reduced, so as to achieve the purpose of rapidly protecting the compressor, and avoid the compressor demagnetization or reliability damage of an electric control component caused by overlarge operation current of the variable-frequency compressor. The method also includes, after the variable-frequency compressor enters the frequency-limited mode, judging whether the operation current at the moment meets the preset up-conversion condition every preset duration; when the operation current at the moment meets the preset up-conversion condition, an up-conversion frequency is output in a preset up-conversion frequency step size; if the current variable-frequency compressor meets the preset up-conversion condition all the time, which indicates that the current variable-frequency compressor can normally operate, and thus retreat from the frequency-limited mode; if the up-conversion condition is not met, maintaining the current frequency output; thus, after the output frequency of the variable-frequency compressor is limited to a lower operation frequency, gradually increasing the operation frequency, finely adjusting the operation frequency of the compressor, and finally stably operating the compressor at a proper frequency point rather than always operating at the lowest point of the frequency-limited frequency, so as to avoid the influence on the refrigeration and heating effects of the air conditioning system and also avoid periodic fluctuations due to limitation to a too high frequency.

In the embodiments described above, preferably, the processor 604 is also configured to execute a computer program to perform: dividing operation frequencies of the variable-frequency compressor, in an ascending order, into a preset number of frequency tap positions; and setting and storing the frequency-limited current, the frequency-limited frequency, the up-conversion frequency step size and the up-conversion current corresponding to each frequency tap position.

The embodiment includes dividing operation frequencies of the variable-frequency compressor into a preset number of frequency tap positions at a frequency interval, and setting the frequency-limited current, the frequency-limited frequency, the up-conversion frequency step size and the up-conversion current corresponding to each frequency tap position, so that the frequency-limited current, the frequency-limited frequency, the up-conversion frequency step size and the up-conversion current corresponding to the frequency tap position can be quickly searched for different operation frequencies. The control speed of the variable-frequency compressor is improved, and the reliability of the system is further guaranteed. Herein, when the frequency is up-converted if meeting the preset up-conversion condition, the frequency value each time the same frequency tap position is up-converted by can be the same or different at the same frequency tap position.

In any of the above embodiments, preferably, the processor 604 is also configured to execute a computer program to perform: inquiring a frequency tap position corresponding to the operation frequency; acquiring the frequency-limited current, the frequency-limited frequency and the up-conversion frequency step size corresponding to the frequency tap position; and setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size.

In the embodiment, the preset frequency-limited current, the preset frequency-limited frequency and the preset up-conversion frequency step size corresponding to the operation frequency at the moment of the variable-frequency compressor are searched by the preset and stored corresponding relation after the acquiring an operation current and an operation frequency of the variable-frequency compressor, so that the output frequency of the variable-frequency compressor is accurately controlled, and the final operation of the variable-frequency compressor at a proper frequency is guaranteed.

In any of the above embodiments, preferably, the processor 604 is also configured to execute a computer program to perform: acquiring an up-conversion current corresponding to a frequency tap position; and the processor 604 is particularly configured to execute a computer program to perform: detecting the operation current at the moment, and determining that the operation current at the moment is less than the up-conversion current corresponding to the frequency tap position, so as to meet the preset up-conversion condition.

The embodiment includes acquiring an up-conversion current corresponding to a frequency tap position before the detecting the operation current at the moment of the variable-frequency compressor, so that the judgment accuracy is improved when judging whether the variable-frequency compressor meets the preset up-conversion condition. The specific judgment process includes judging whether the operation current at the moment is less than the up-conversion current corresponding to the frequency tap position; if the preset up-conversion current is less than the frequency-limited current, the operation current at the moment meets the up-conversion condition; that is, if the operation current at the moment of the variable-frequency compressor is a small value, the current frequency output can be slightly up-converted by a few hertz, so as to avoid the influence on the refrigeration and heating effects caused by the fact that the variable-frequency compressor is always at a lower operation frequency.

In any of the above embodiments, preferably, the preset up-conversion frequency step size is less than a difference between the operation frequency and the frequency-limited frequency.

In the embodiment, the preset up-conversion frequency step size is less than a difference between the operation frequency and the frequency-limited frequency, that is, when the operation current of the variable-frequency compressor is large, the output frequency is directly limited to at a lower operation frequency, and when the preset up-conversion condition is met, the output frequency of the variable-frequency compressor is finely adjusted step by step, and only a few Hertz rises each time, so as to, on the one hand, avoid the influence on the refrigeration and heating effects of the air conditioning system caused by the fact that the variable-frequency compressor operates at the lowest point of the frequency-limited frequency uniformly, and on the other hand, also avoid the periodic fluctuation due to limitation to a too high frequency.

Figure 7:
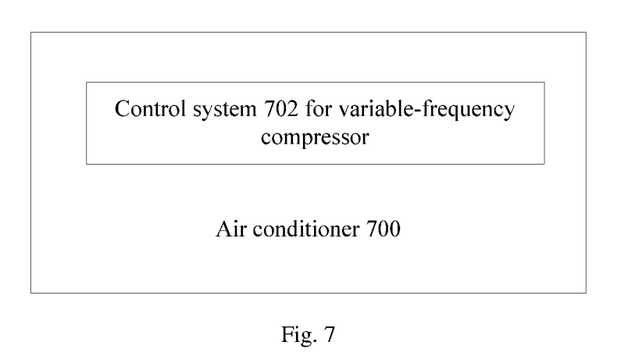
FIG. 7 is a schematic block diagram of an air conditioner according to an embodiment of the present disclosure.

An embodiment of a third aspect of the present disclosure provides a variable-frequency air conditioner, and FIG. 7 is a schematic block diagram illustrating an air conditioner 700 according to an embodiment of the present disclosure. Herein, the air conditioner 700 includes a variable-frequency compressor; and a control system 702 for the variable-frequency compressor, wherein the control system 702 for the variable-frequency compressor is configured to control the variable-frequency compressor.

The present disclosure provides an air conditioner 700, which includes a control system 702 for a variable-frequency compressor in any technical solution, wherein the control system 702 for the variable-frequency compressor is configured to control the variable-frequency compressor, and thus it has all the technical effects of the control system 702 for the variable-frequency compressor are achieved, which will not be described in detail herein.

An embodiment of the fourth aspect of the present disclosure provide a computer readable storage medium having stored therein a computer program that, when executed by a processor, causes the processor to perform a control method for a variable-frequency compressor as described in any of the embodiments described above.

The present disclosure provides a computer readable storage medium having stored therein a computer program that, when executed by a processor, causes the processor to perform a control method for a variable-frequency compressor as described in any of the above technical solutions, and thus it has all the technical effects of the control method for the variable-frequency compressor, which will not be described in detail herein.

In the description of the present specification, the description of the terms "an embodiment", "some embodiments", "specific embodiments", etc., means that a particular feature, structure, material, or characteristic described in connection with the embodiment or example is included in at least one embodiment or example of the present disclosure. In this specification, schematic representations of the above terms do not necessarily refer to the same embodiment or example. Furthermore, the particular features, structures, materials, or characteristics described may be combined in any suitable manner in any one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control method for a variable-frequency compressor, comprising:
acquiring an operation current and an operation frequency of the variable-frequency compressor;
determining that the operation current is greater than or equal to a preset frequency-limited current, and reducing the operation frequency to a preset frequency-limited frequency so as to enable the variable-frequency compressor to enter a frequency-limited mode;
detecting an operation current at a moment of the variable-frequency compressor every preset duration;
determining that the operation current at the moment meets a preset up-conversion condition, and increasing an operation frequency at the moment of the variable-frequency compressor by a preset up-conversion frequency step size until the variable-frequency compressor retreating from the frequency-limited mode;
determining that the operation current at the moment does not meet the preset up-conversion condition, and controlling the variable-frequency compressor to maintain the operation frequency at the moment;
dividing operation frequencies of the variable-frequency compressor, in an ascending order, into a preset number of frequency tap positions; and
setting and storing a frequency-limited current, a frequency-limited frequency, an up-conversion frequency step size and an up-conversion current corresponding to each frequency tap position.

2. The control method for the variable-frequency compressor as claimed in claim 1, wherein after acquiring the operation current and the operation frequency of the variable-frequency compressor, the control method further comprises:
inquiring a frequency tap position corresponding to the operation frequency;
acquiring a frequency-limited current, a frequency-limited frequency and an up-conversion frequency step size corresponding to the frequency tap position; and
setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size.

3. The control method for the variable-frequency compressor as claimed in claim 2, wherein the preset up-conversion frequency step size is less than a difference between the operation frequency and the preset frequency-limited frequency.

4. The control method for the variable-frequency compressor as claimed in claim 1, further comprising:
acquiring an up-conversion current corresponding to the frequency tap position;
detecting the operation current at the moment of the variable-frequency compressor specifically comprising:
detecting the operation current at the moment, and determining that the operation current at the moment is less than the up-conversion current corresponding to the frequency tap position, so as to meet the preset up-conversion condition.

5. The control method for the variable-frequency compressor as claimed in claim 4, wherein the preset up-conversion frequency step size is less than a difference between the operation frequency and the preset frequency-limited frequency.

6. The control method for the variable-frequency compressor as claimed in claim 1, wherein the preset up-conversion frequency step size is less than a difference between the operation frequency and the preset frequency-limited frequency.

7. A non-transitory computer readable storage medium having stored therein a computer program that, when executed by a processor, causes the processor to perform a control method for a variable-frequency compressor as claimed in claim 1.

8. The control method for the variable-frequency compressor as claimed in claim 1, wherein the preset up-conversion frequency step size is less than a difference between the operation frequency and the preset frequency-limited frequency.

9. A control system for a variable-frequency compressor, comprising:
   a memory configured to store a computer program;
   a processor configured to execute the computer program to perform:
   acquiring an operation current and an operation frequency of the variable-frequency compressor;
   determining that the operation current is greater than or equal to a preset frequency-limited current, and reducing the operation frequency to a preset frequency-limited frequency so as to enable the variable-frequency compressor to enter a frequency-limited mode;
   detecting the operation current at a moment of the variable-frequency compressor every preset duration;
   determining that the operation current at the moment meets a preset up-conversion condition, and increasing the operation frequency at the moment of the variable-frequency compressor by a preset up-conversion frequency step size until the variable-frequency compressor retreating from the frequency-limited mode;
   determining that the operation current at the moment does not meet the preset up-conversion condition, and controlling the variable-frequency compressor to maintain the operation frequency at the moment;
   dividing operation frequencies of the variable-frequency compressor, in an ascending order, into a preset number of frequency tap positions; and
   setting and storing a frequency-limited current, a frequency-limited frequency, an up-conversion frequency step size and an up-conversion current corresponding to each frequency tap position.

10. The control system for the variable-frequency compressor as claimed in claim 9, wherein the processor is further configured to execute the computer program to perform:
    inquiring a frequency tap position corresponding to the operation frequency;
    acquiring a frequency-limited current, a frequency-limited frequency and an up-conversion frequency step size corresponding to the frequency tap position; and
    setting the frequency-limited current corresponding to the frequency tap position as a preset frequency-limited current, setting the frequency-limited frequency corresponding to the frequency tap position as a preset frequency-limited frequency, and setting the up-conversion frequency step size corresponding to the frequency tap position as a preset up-conversion frequency step size.

11. The control system for the variable-frequency compressor as claimed in claim 10, wherein the preset up-conversion frequency step size is less than a difference between the operation frequency and the preset frequency-limited frequency.

12. An air conditioner, comprising:
    a variable-frequency compressor; and
    a control system for the variable-frequency compressor as claimed in claim 10, wherein the control system for the variable-frequency compressor is configured to control the variable-frequency compressor.

13. The control system for the variable-frequency compressor as claimed in claim 9, wherein the processor is further configured to execute the computer program to perform: acquiring an up-conversion current corresponding to the frequency tap position;
    the processor is specifically configured to execute the computer program to perform: detecting the operation current at the moment, and determining that the operation current at the moment is less than the up-conversion current corresponding to the frequency tap position, so as to meet the preset up-conversion condition.

14. The control system for the variable-frequency compressor as claimed in claim 13, wherein the preset up-conversion frequency step size is less than a difference between the operation frequency and the preset frequency-limited frequency.

15. The control system for the variable-frequency compressor as claimed in claim 9, wherein the preset up-conversion frequency step size is less than a difference between the operation frequency and the preset frequency-limited frequency.

16. An air conditioner, comprising:
    a variable-frequency compressor; and
    a control system for the variable-frequency compressor as claimed in claim 9, wherein the control system for the variable-frequency compressor is configured to control the variable-frequency compressor.

17. The control system for the variable-frequency compressor as claimed in claim 9, wherein the preset up-conversion frequency step size is less than a difference between the operation frequency and the preset frequency-limited frequency.

18. An air conditioner, comprising:
    a variable-frequency compressor; and
    a control system for the variable-frequency compressor as claimed in claim 9, wherein the control system for the variable-frequency compressor is configured to control the variable-frequency compressor.

* * * * *